(12) United States Patent
Son et al.

(10) Patent No.: US 11,717,955 B2
(45) Date of Patent: Aug. 8, 2023

(54) ROBOT SYSTEM AND METHOD FOR CONTROLLING THE SAME

(71) Applicant: LG ELECTRONICS INC., Seoul (KR)

(72) Inventors: Jungkyu Son, Seoul (KR); Jinsu Kim, Seoul (KR); Boyeon Kim, Seoul (KR); Hyesun Lee, Seoul (KR); Bina Kim, Seoul (KR); Mina Suh, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 707 days.

(21) Appl. No.: 16/803,277

(22) Filed: Feb. 27, 2020

(65) Prior Publication Data

US 2021/0146526 A1    May 20, 2021

(30) Foreign Application Priority Data

Nov. 18, 2019  (KR) ......................... 10-2019-0147588

(51) Int. Cl.
| | |
|---|---|
| *A61G 5/10* | (2006.01) |
| *B25J 5/00* | (2006.01) |
| *B25J 9/00* | (2006.01) |
| *B25J 9/16* | (2006.01) |
| *A61G 5/04* | (2013.01) |
| *A61G 5/12* | (2006.01) |
| *B25J 11/00* | (2006.01) |

(52) U.S. Cl.
CPC ............. *B25J 5/007* (2013.01); *A61G 5/045* (2013.01); *A61G 5/128* (2016.11); *B25J 9/0009* (2013.01); *B25J 9/161* (2013.01); *A61G 5/04* (2013.01); *A61G 5/10* (2013.01); *A61G 2203/30* (2013.01); *B25J 11/009* (2013.01)

(58) Field of Classification Search
CPC .... A61G 5/045; A61G 5/128; A61G 2203/30; B60Q 1/34; B60Q 1/346; B60Q 1/507; B60Q 2400/50; B60Q 2800/10; G01C 21/3632; G01C 21/365; B62J 6/05
See application file for complete search history.

(56) References Cited

U.S. PATENT DOCUMENTS

| | | | | | |
|---|---|---|---|---|---|
| 5,769,440 | A | * | 6/1998 | Jones ..................... | B62B 5/002 280/204 |
| 10,919,445 | B2 | * | 2/2021 | Sakata ................... | H05B 47/10 |
| 10,933,803 | B2 | * | 3/2021 | Shih ....................... | B60Q 1/50 |

(Continued)

FOREIGN PATENT DOCUMENTS

| | | | | |
|---|---|---|---|---|
| DE | 102016113913 | A1 * | 2/2018 | .......... B60Q 1/0035 |
| DE | 112017000533 | T5 * | 10/2018 | ............ A47L 5/362 |

(Continued)

*Primary Examiner* — Steve Clemmons
(74) *Attorney, Agent, or Firm* — Birch, Stewart, Kolasch & Birch, LLP

(57) ABSTRACT

Provided is a robot including a main body having a traveling wheel and a traveling motor for rotating the traveling wheel, a seating body disposed above the main body, a left projector disposed at a left side of the main body to scan a beam toward a left lower direction, a right projector disposed at a right side of the main body to scan a beam toward a right lower direction, and a processor for controlling the traveling motor, the left projector, and the right projector.

15 Claims, 14 Drawing Sheets

(56) References Cited

U.S. PATENT DOCUMENTS

| | | | |
|---|---|---|---|
| 10,988,078 B2* | 4/2021 | Fukumoto | B60Q 1/50 |
| 11,403,946 B2* | 8/2022 | Jang | B60Q 1/324 |
| 2013/0335212 A1* | 12/2013 | Purks | B60Q 1/34 |
| | | | 340/465 |
| 2014/0300464 A1* | 10/2014 | Chen | B60Q 1/2607 |
| | | | 340/471 |
| 2017/0001554 A1* | 1/2017 | Sørensen | B60Q 1/50 |
| 2019/0166338 A1* | 5/2019 | Greenwood | G06V 20/56 |
| 2019/0291278 A1* | 9/2019 | Hashiguchi | B60Q 1/30 |
| 2020/0369202 A1* | 11/2020 | Ching | B60Q 1/32 |

FOREIGN PATENT DOCUMENTS

| | | | | |
|---|---|---|---|---|
| JP | 2005324297 A * | 11/2005 | | G06K 9/00201 |
| JP | 2011156057 A * | 8/2011 | | |
| KR | 10-1089735 B1 | 12/2011 | | |
| KR | 20130037813 A * | 4/2013 | | |
| WO | WO-2014122750 A1 * | 8/2014 | | A61G 5/04 |
| WO | WO-2018162219 A1 * | 9/2018 | | B60Q 1/0023 |

\* cited by examiner

ROBOT SYSTEM AND METHOD FOR CONTROLLING THE SAME

CROSS-REFERENCE TO RELATED APPLICATIONS

This application claims the benefit of priority to Korean Patent Application No. 10-2019-0147588, filed on Nov. 18, 2019 in the Korean Intellectual Property Office, the disclosure of which is incorporated herein by reference in its entirety.

FIELD OF THE DISCLOSURE

The present disclosure relates to a robot and a method for controlling the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

In recent years, there has been a trend of increasing in number of guidance robots, which provide a variety of guidance services at the airport, government offices, etc., a transport robot for transporting goods, or a boarding robot on which the user boards.

The robot may include a projection capable of scanning an image for transmitting various information to the outside. An example of such a projection includes a projection that outputs an image beam having a donut shape onto a bottom surface, which is disclosed in Korea Patent Publication No. 10-1089735 (Published on Dec. 7, 2011).

The projection includes a mobile robot provided as an external image providing device that is movable and scans an image, a beam projector that is vertically placed at an upper end of the mobile robot and outputs an image beam in a direction of the upper end, an enlarged lens for enlarging the image beam in a front direction, and an inverted cone reflector disposed above the enlarged lens to enlarge the image beam outputted from the enlarged lens toward a bottom side.

SUMMARY

The robot according to the related art has a limitation that the user is not easy to move on the boarding robot due to the beam projector and the reflector disposed on the mobile robot.

Embodiments provide a robot which is capable of moving while a rider is sitting on a seating body and in which a rider sitting on the seating body or surrounding pedestrian are capable of easily recognizing information of the robot by a beam generated at a left or right side of the robot, and a method for controlling the same.

Embodiments also provide a robot that assists a rider to move quickly and a method for controlling the same.

In an embodiment, a robot includes: a main body provided with at least one traveling wheel and a traveling motor configured to allow the traveling wheel to rotate; a seating body disposed above the main body; a left projector disposed at a left side of the main body to scan a beam toward a left lower direction; a right projector disposed at a right side of the main body to scan a beam toward a right lower direction; and a processor configured to control the traveling motor, the left projector, and the right projector.

The robot may further include a foot supporter disposed on a front lower portion of the main body. A beam scan area of the left projector may include an area of a bottom surface from a left lower point of the main body to a left lower point of the foot supporter. A beam scan area of the right projector may include an area of the bottom surface from a right lower point of the main body to a right lower point of the foot supporter.

When one of the left projector and the right projector is turned on, the other one of the left projector and the right projector may be maintained to be turned off.

In the processor, before the main body is switched in direction, a projector corresponding to the switching in direction of the main body between the left projector and the right projector may be turned on in advance.

The processor may initiate the switching in direction of the main body while one of the left projector and the right projector is maintained in the turn-on state.

The processor may switch a direction of the main body when a set time elapses after one of the left projector and the right projector is turned on.

The processor may maintain the turn-on state of the projector that is turned on while the main body is switched in direction.

The processor may turn off the projector that is turned on when the main body is completely switched in direction.

The main body may be provided with a left hole in which the left projector is disposed and a right hole in which the right projector is disposed.

The left hole may face between a left direction and a front direction and be inclined downward. The right hole may face between a right direction and the front direction and be inclined downward.

Each of the left projector and the right projector may include: a laser light module; a module cap disposed in a hole defined in the main body; and a transmission plate configured to cover an outer surface of the module cap.

Each of the left projector and the right projector may be spaced apart from the foot supporter in a front-rear direction.

At least a portion of each of the left projector and the right projector may face the foot supporter in the front-rear direction.

In another embodiment, a robot includes: a main body; left and right traveling wheels disposed on the main body so as to be spaced apart from each other; a left traveling motor configured to allow the left traveling wheel to rotate; a right traveling motor configured to allow the right traveling wheel to rotate; a seating body disposed above the main body; a left projector disposed at a left side of the main body to scan a beam toward a left lower side; a right projector disposed at a right side of the main body to scan the beam toward a right lower side; and a processor configured to control the traveling motor, the left projector, and the right projector. The processor may turn on the left projector before switched in a left direction and allow the right traveling motor to rotate at a higher speed than a speed of the left traveling motor after turning on the left projector. The processor may turn on the right projector before switched in a right direction and allow the left traveling motor to rotate at a higher speed than that of the right traveling motor after turning on the right projector.

The robot may further include: a foot supporter disposed on a front lower portion of the main body; and a rear accessory disposed behind the main body, wherein the foot supporter and the rear accessory may be disposed on an area except for a beam scan area of the left projector and a beam scan area of the right projector.

The processor may turn off the left projector when the left turn of the main body is completed. The processor may turn off the right projector when the right turn of the main body is completed.

When one of the left projector and the right projector is turned on, the other one of the left projector and the right projector may be maintained to be turned off.

In further another embodiment, a robot is controlled through a method for controlling the robot, and the robot includes a main body which is provided with at least a traveling wheel and a traveling motor configured to allow the traveling wheel to rotate and over which a seating body is disposed, wherein a left projector is disposed at a left side of the main body, and a right projector is disposed at a right side of the main body.

The method may include: turning on a projector of the left projector and the right projector, which corresponds to switching in direction of the main body, in advance before the main body is switched in direction; and switching the direction of the main body while the projector is turned on.

The switching of the direction of the main body may be initiated when a set time elapses after the projector is turned on.

The switching of the direction of the main body may be ended when the main body is completely switched in direction.

The projector may be maintained in the turn-on state while the main body is switched in direction, and the projector, which is maintained in the turn-on state, may be turned off when the switching of the direction of the main body is ended.

The details of one or more implementations are set forth in the accompanying drawings and the description below. Other features will be apparent from the description and drawings, and from the claims.

DETAILED DESCRIPTION OF THE EMBODIMENTS

Figure 1:
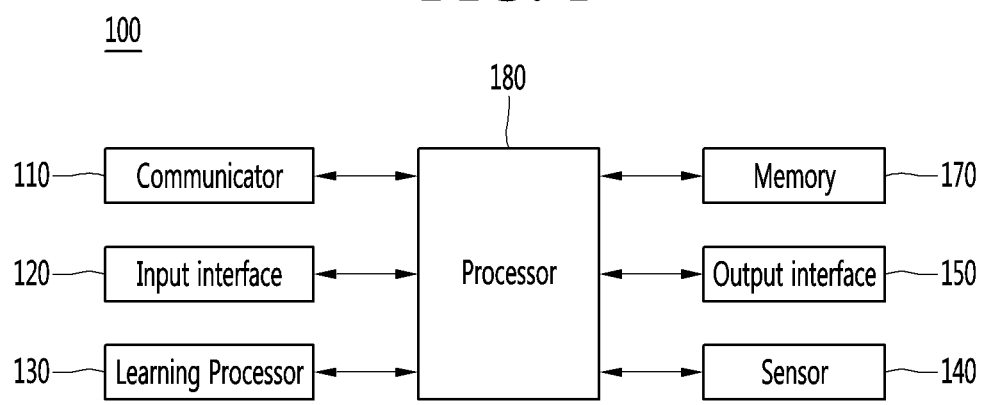
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with a learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
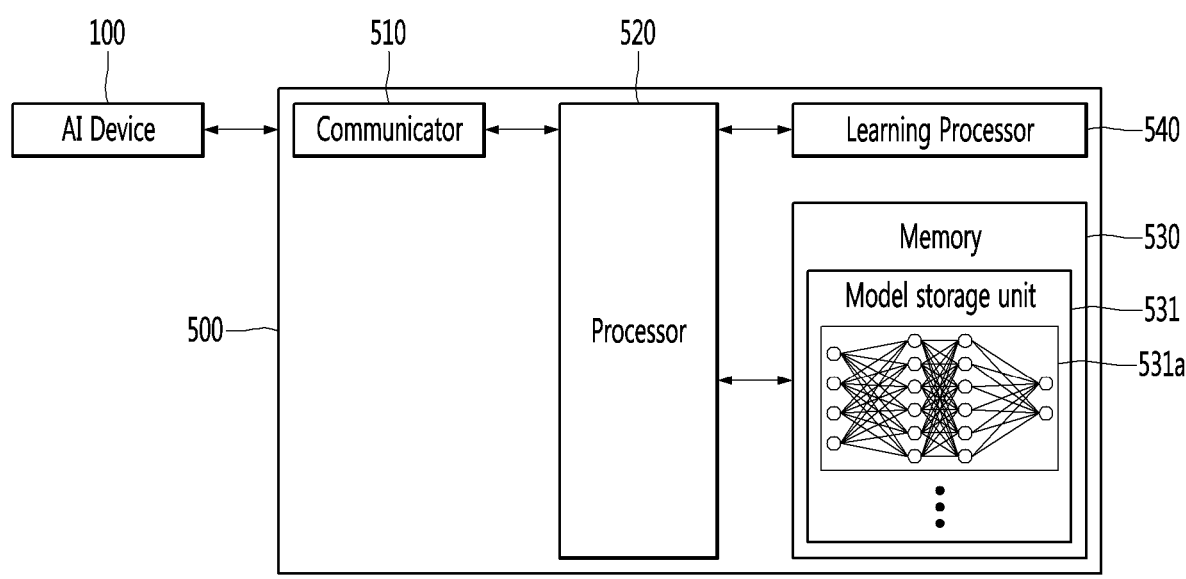
FIG. 2 is a view illustrating an AI server of a robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a memory 530, a learning processor 540, a processor 520, and the like.

The communicator 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
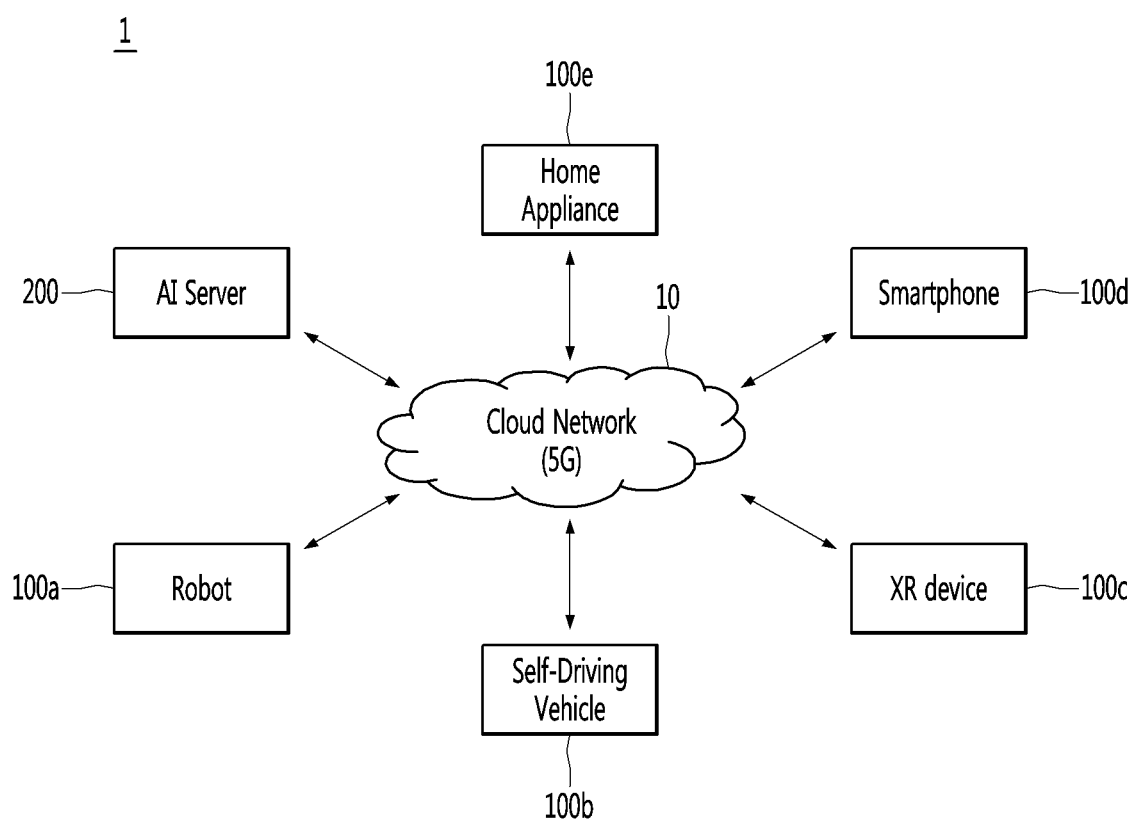
FIG. 3 is a view illustrating an AI system to which a robot system according to an embodiment is applied.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, the robot 100a will be described as an example of the boarding robot on which the user is capable of boarding.

Figure 4:
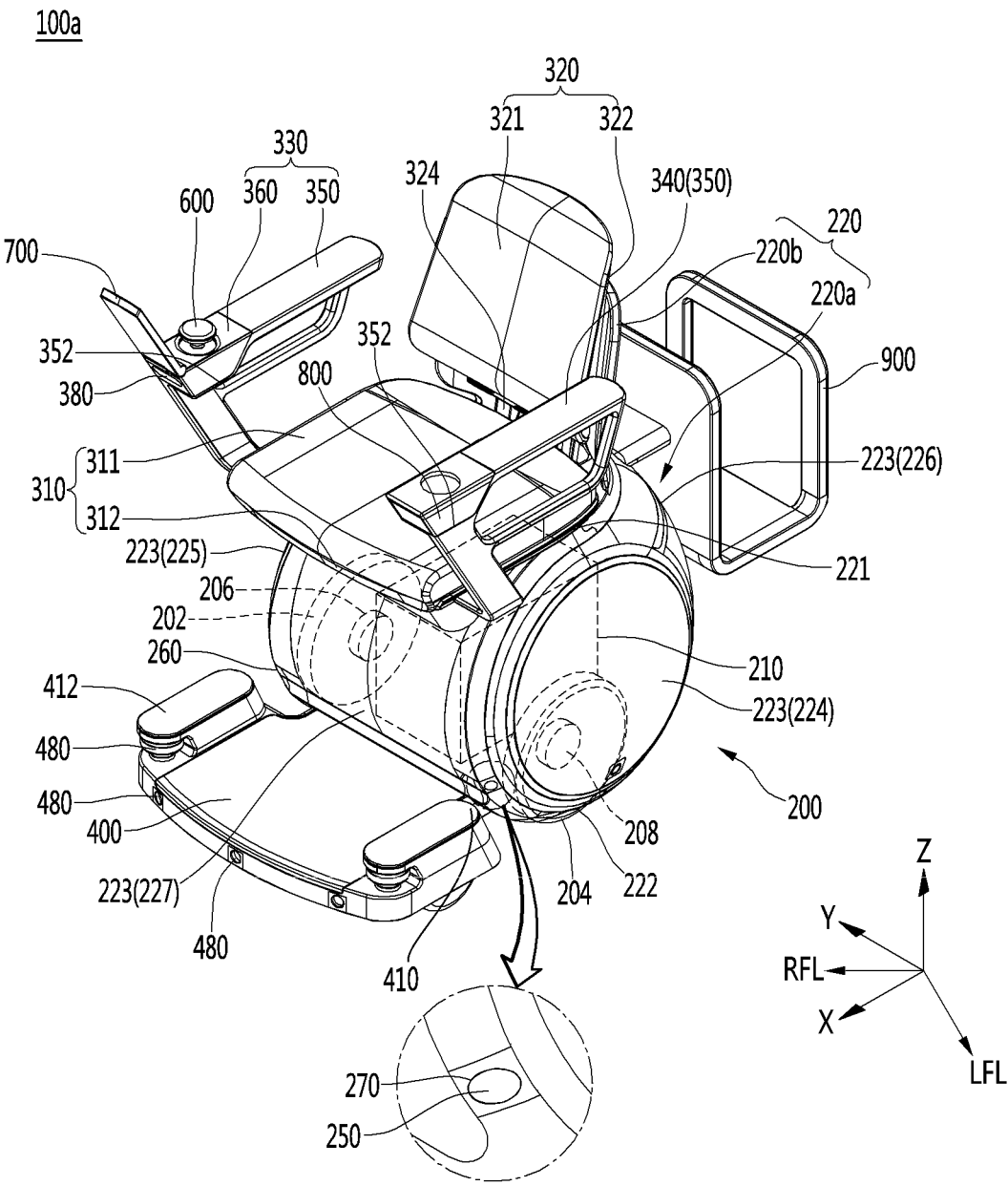
FIG. 4 is a perspective view of a robot according to an embodiment.
Figure 5:
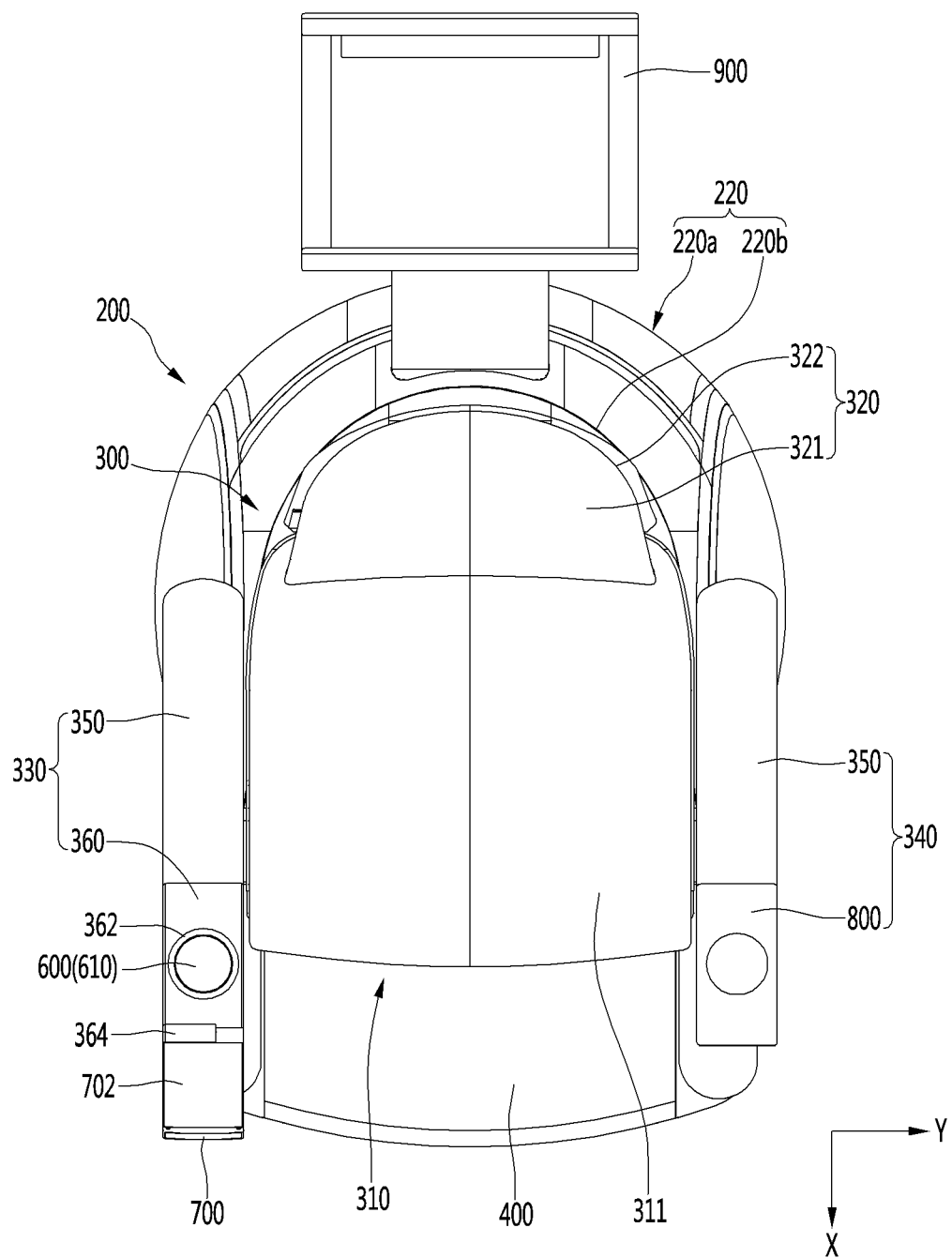
FIG. 5 is a plan view of the robot according to an embodiment.
Figure 6:
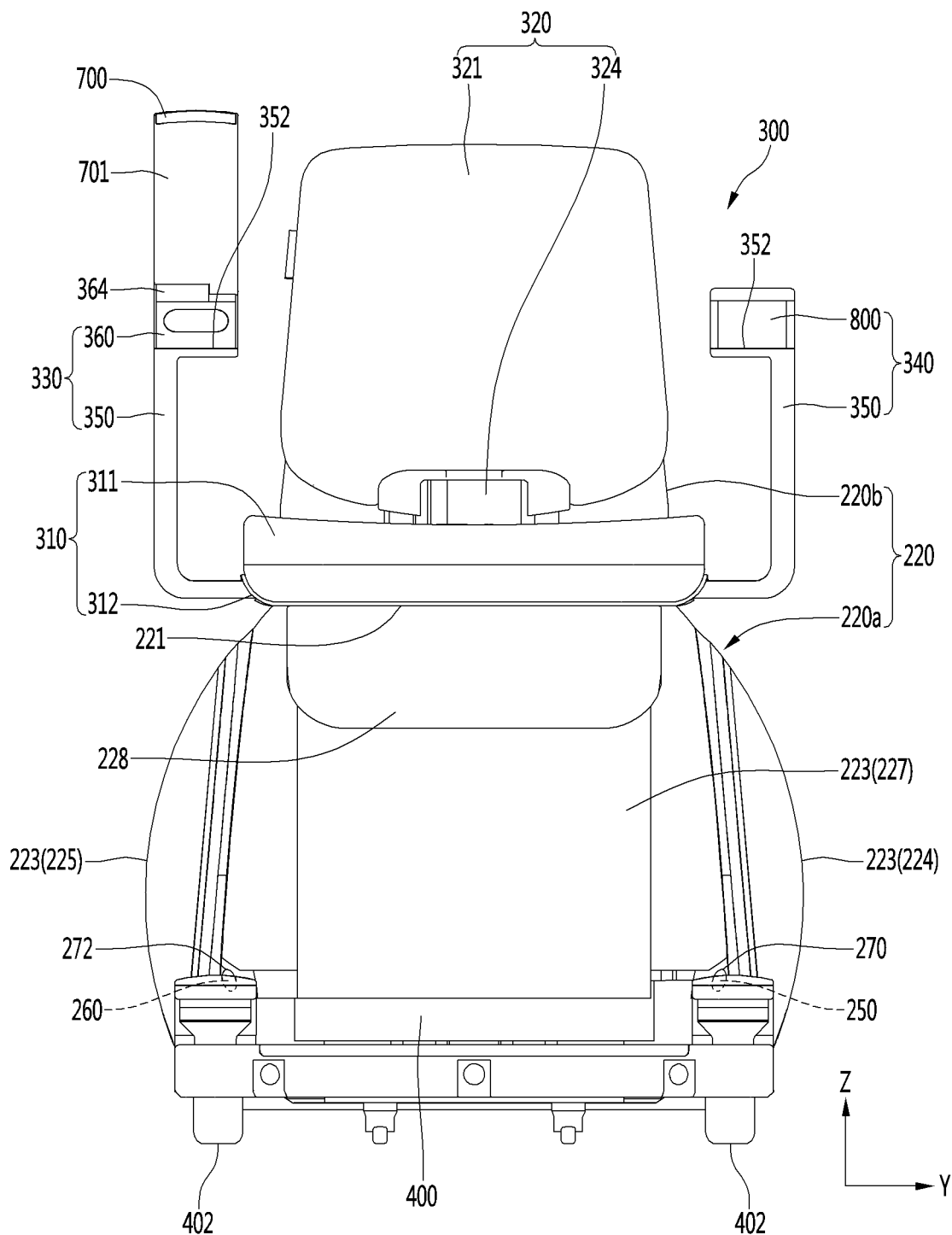
FIG. 6 is a front view of the robot according to an embodiment.
Figure 7:
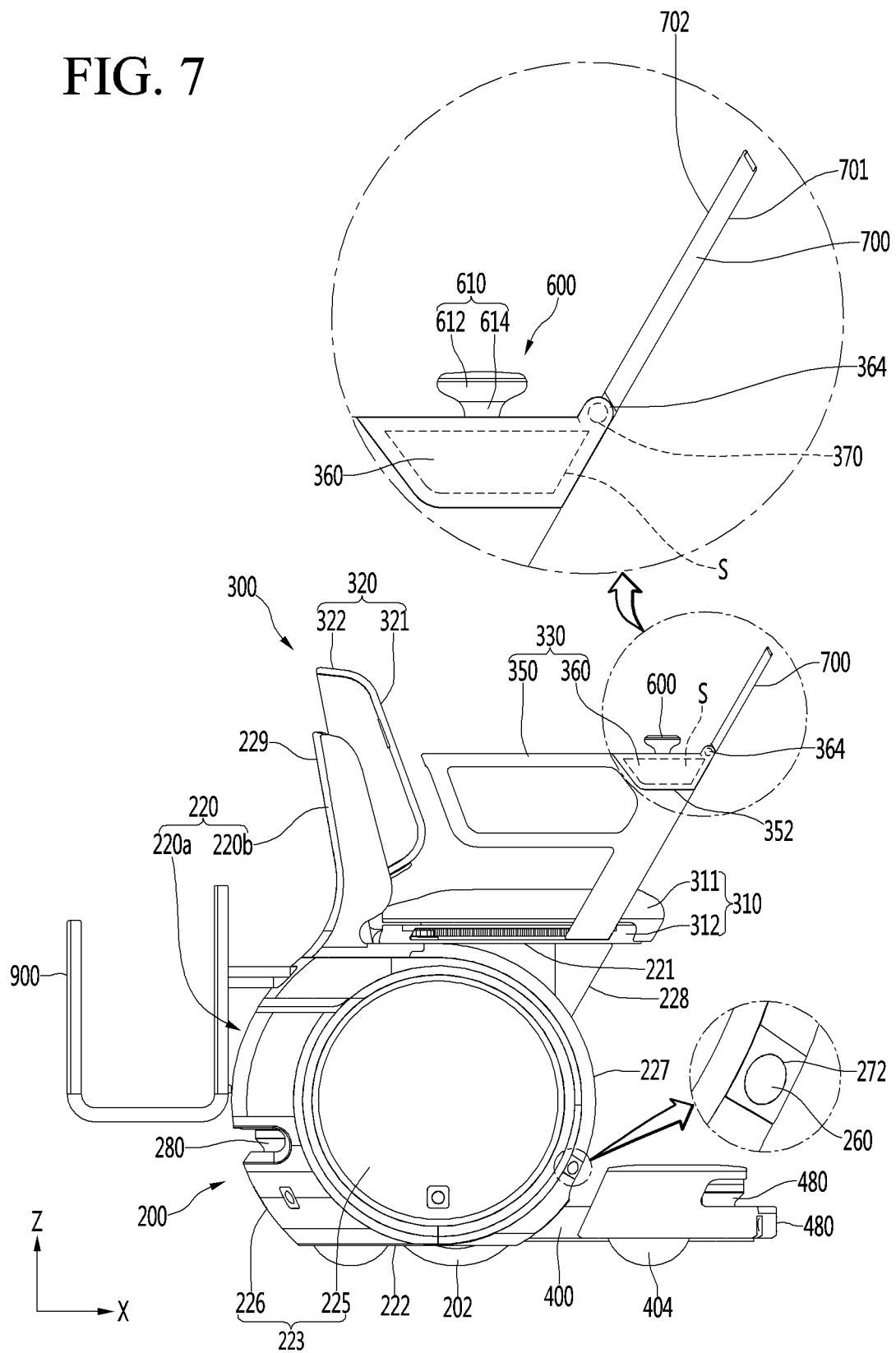
FIG. 7 is a side view of the robot according to an embodiment.

FIG. 4 is a perspective view of a robot according to an embodiment, FIG. 5 is a plan view of the robot according to an embodiment, FIG. 6 is a front view of the robot according to an embodiment, and FIG. 7 is a side view of the robot according to an embodiment.

The robot 100a may include a main body 200.

The main body 200 may include at least one traveling wheel and may be a traveling module or a mobile robot that is capable of traveling according to a user's input or autonomously traveling.

The main body 200 may be an assembly of a plurality of parts, and the main body 200 may further include a driving mechanism (or traveling mechanism) that is connected to the traveling wheel to allow the traveling wheel to rotate forward and backward.

The traveling wheel may be provided in a pair on the main body 200. The pair of traveling wheels 202 and 204 may be provided on the main body 200 so as to be spaced apart from each other in a left-right direction (i.e., horizontal direction or horizontal axis) Y.

The driving mechanism may include a traveling motor generating driving force for allowing the traveling wheels 202 and 204 to rotate. In an example of the driving mechanism, the traveling motor may be directly connected to the traveling wheels 202 and 204 so that the traveling wheels 202 and 204 directly rotate forward and backward by the traveling motor. In another example of the driving mechanism, the traveling motor may be connected to the traveling wheels 202 and 204 through various power transmission members such as a rotation shaft and gears to allow the traveling wheels 202 and 204 to rotate forward and backward through the power transmission member.

The main body 200 may include a separate steering wheel (or steering mechanism) disposed to be spaced apart from the traveling wheels 202 and 204 so as to switch a traveling direction of the robot 100a. The direction of the steering wheel and the traveling direction of the main body 200 may be determined by a steering 600 that will be described below.

The main body 200 may not include the separate steering wheel for switching the traveling direction of the main body 200, and the traveling direction of the main body 200 may be determined using a pair of traveling wheels 202 and 204. The traveling direction of the main body 200 may be determined using the rotation direction of each of the pair of traveling wheels 202 and 204 or a difference in rotation speed of the pair of traveling wheels 202 and 204.

The main body 200 may be configured to allow the pair of traveling wheels 202 and 204 to rotate independently with respect to each other and include a pair of traveling motors 206 and 208 for allowing the pair of traveling wheels 202 and 204 to rotate. The pair of traveling motors 206 and 208 may include a right traveling motor 206 for allowing the right traveling wheel 202 of the pair of traveling wheels 202 and 204 to rotate and a left traveling motor 208 for allowing the left traveling wheel 204 of the pair of traveling wheels 202 and 204 to rotate.

The main body 200 may further include a battery 210 for supplying power to each component of the robot 100a. The battery 210 may be disposed in the main body 200 in consideration of a center of gravity of the entire robot 100a.

The main body 200 may include a housing 220 defining an outer appearance. The housing 220 may be provided as an assembly of a plurality of members. The housing 220 may include a top surface 221, a bottom surface 222, and a circumferential surface 223.

Each of the top surface 221 and the bottom surface 222 of the housing 220 may have a planar shape, and the circumferential surface 223 of the housing 220 may have a curved shape.

The circumferential surface 223 may include a left surface 224, a right surface 225, a rear surface 226, and a front surface 227.

The left surface 224 may be convex toward a left side, and the right surface 225 may be convex toward a right side. And, the rear surface 226 may be convex toward a rear side between an upper end and a lower end. The front surface 227 may be convex forward between the upper and lower ends.

The upper end of the front surface 227 of the circumferential surface 223 may extend closer to a rear end among a front end of the top surface 221 and the rear end of the top surface 221.

The circumferential surface 223 may further include a plane 228 extending from one side of the convex front surface 227 to the front end of the top surface 221. The plane 228 may be an inclined surface that is inclined to face in a front lower direction.

The housing 220 may further include an upper rear surface 229 extending upward from an upper portion of the convex rear surface 226.

The housing 220 includes a lower housing 220a including a top surface 221, a bottom surface 222, and a circumferential surface 223 and an upper housing 220b extending from one side of the lower housing 220a to protrude upward and including an upper rear surface 229.

The lower housing 220a may be provided in a spherical shape of which each of top and bottom surfaces 221 and 222 are flat as a whole.

The upper housing 220b may extend from a rear upper portion of the lower housing 220a to a rear side of a backrest 320 to be described later.

The traveling wheels 202 and 204 may be rotatably disposed in the housing 220, and a lower portion of each of the traveling wheels 202 and 204 may be disposed in the housing 220 to pass through a wheel through-hole defined in a lower portion of the housing 220.

A space may be defined in the housing 220, and the battery 210 may be accommodated in the space defined in the housing 220.

The robot 100a may further include a seating body 300 disposed above the main body 200 and a foot supporter 400 disposed in front of the main body 200.

The seating body 300 may be configured to allow the user to be seated. The seating body 300 may be provided with a seat for allowing the user to be seated thereon. Also, the seating body 300 may be provided with an armrest for allowing a user's arm to be placed. A height of the armrest may be higher than a height of the seat.

The seating body 300 may further include a seat body 310 on which the user sits and a backrest 320 on which the user leans back.

The seat body 310 may include a lower cushion 311 and a lower seat body 312 on which the lower cushion 311 is mounted.

The lower cushion 311 may be disposed on a top surface of the lower seat body 312. The lower cushion 311 may be provided to be more elastic than the lower seat body 312.

The lower seat body 312 may be disposed on an upper portion of the housing 220, in particular, the lower housing 220a. The lower seat body 312 may cover a space defined in the housing 220.

The seat body 310 may not include the lower cushion 311, but may include the lower seat body 312.

The backrest 320 may include a rear cushion 321 and a rear seat body 322 supporting the rear cushion 321. The rear seat body 322 may be supported by a rear supporter 324, and the backrest 320 may further include the rear supporter 324.

The rear cushion 321 may be disposed on a front surface of the rear seat body 322. The rear cushion 321 may be provided to be more elastic than the rear seat body 322.

The rear seat body 322 may entirely or partially overlap the upper housing 220b in a front-rear direction (i.e., longitudinal direction), and the rear supporter 324 may overlap the upper housing 220b in the front-rear direction. The rear seat body 322 and the rear supporter 324 may be protected by the upper housing 220b.

A lower portion of the rear supporter 324 may be connected to the lower seat body 312. The rear supporter 324 may be configured so that an upper part thereof is bent with respect to the lower part thereof. The lower portion of the rear supporter 324 may be rotatably connected to the lower seat body 312 by a hinge shaft, and the backrest 320 may be disposed to rotate about the lower portion.

The backrest 320 may not include the rear cushion 321, but may include the rear seat body 322 and the rear supporter 324.

The armrest may be disposed in the seat body 310 so as to move forward and backward. The armrest may be provided in a pair on the seating body 300.

The pair of armrests 330 and 340 may include a right armrest 330 and a left armrest 340 and the right armrest 330 and the left armrest 340 may be spaced apart from each other in the left-right direction Y and may be arranged symmetrical to each other in the left-right direction Y.

The pair of armrests 330 and 340 may be disposed on the seat body 310, in particular, the lower seat body 312 so as to move forward and backward, and a lower portion of each of the pair of armrests 330 and 340 may be inserted into the lower seat body 312. The lower portion of each of the pair of armrests 330 and 340 may be guided to move forward and backward in a front-rear direction X along a guide provided on the seat body 310.

The foot supporter 400 may be disposed on the main body 200. The foot supporter 400 may be disposed on the main body 200 to protrude in the front-rear direction. The foot supporter 400 may be disposed at a front lower portion of the main body 200. The foot supporter 400 may be disposed on the main body 200 to move forward and backward in the front-rear direction X.

An auxiliary wheel supporting the foot supporter 400 may be disposed on the foot supporter 400. A pair of auxiliary wheels 402 and 404 may be provided on the foot supporter 400, and the pair of auxiliary wheels 402 and 404 may be disposed the foot supporter 400 so as to be spaced apart from each other in a horizontal direction Y.

The robot 100*a* may include a steering 600 operated by the user. The steering 600 may be an adjusting device such as a jog & shuttle or a joystick.

The steering 600 may include a handle 612 held by the user. The steering 600 may be an input interface that is held and manipulated by the user's hand to input a traveling direction or traveling speed of the robot 100*a*.

The steering 600 may be disposed on at least one armrest. The steering 600 may be provided on each of the pair of armrests 330 and 340 and may be disposed on one of the pair of armrests 330 and 340.

The steering 600 may include a steering body 610 that is held by the user's hand. The steering body 610 may be a body which is held by the user's hand so as to be manipulated in various directions such as front, rear, left, and right directions. A handle 612 that is held by the user's hand may be disposed on an upper portion of the steering body 610. The steering body 610 may include a steering shaft 614 extending from a lower portion of the handle 612.

The user may hold the handle 612 while sitting on the seat body 310 to push the steering body 610 forward, pull the steering body 610 backward, or push the steering body to a left or right side.

For example, in the steering body 610, the handle 612 is inclined to one side such as the front, rear, left, or right side with respect to the steering shaft 614. The robot 100*a* may include a sensor sensing an inclination angle and an inclination direction of the steering body 610. The robot 100*a* may sense a steering direction or speed by the inclination angle (or inclination angle), the inclination direction, etc., of the steering body 610, which are sensed by the sensor.

For another example, in the steering body 610, the steering shaft 614 and the handle 612 may be disposed to move to the front, rear, left, or right side. The robot 100*a* may include a sensor sensing a position of the steering body 610. The robot 100*a* may sense the steering direction or speed according to the position of the steering body 610, which is sensed by the sensor.

For another example, in the steering body 610, the steering shaft 614 and the handle 612 may be disposed to rotate in a clockwise or counterclockwise direction. The robot 100*a* may include a sensor sensing a rotation angle of the steering body 610. The robot 100*a* may sense the steering direction or speed according to the rotation angle of the steering body 610, which is sensed by the sensor.

The sensor may transmit a signal of the sensed steering direction or speed to a processor 180, and the processor 180 may control the traveling motors 206 and 208 which will be described later according to the signal transmitted from the sensor.

The robot 100*a* may further include a display 700. The display 700 may be disposed on at least one of the pair of armrests 330 and 340. The display 700 may be disposed to rotate about a horizontal rotation center. The display 700 may be an output interface capable of displaying various information such as traveling information.

The display 700 may be rotatably connected to the steering housing 360. The display 700 may be connected to the front end of the steering housing 360.

A display connection portion 364 to which the display 700 is rotatably connected may be provided in the steering housing 360.

The display connection portion 364 may be spaced apart from the steering body 610 in a horizontal direction when the steering body 610 ascends.

The robot 100*a* may further include a display rotator 370 that allows the display 700 to rotate. The display rotator 370 may be a rotating mechanism for allowing the display 700 connected to the display 700 to rotate. The display rotator 370 may include a display motor connected to the display 700 to allow the display 700 to rotate. Hereinafter, for convenience, like the display rotator 370, the display motor will be described with reference numeral 370. The display motor 370 may be disposed to be accommodated in the display connection portion 364. A motor space in which the display motor 370 is accommodated may be defined in the display connection portion 364.

The display motor 370 may be provided with a rotation shaft that allows the display 700 to rotate, and the rotation shaft may be disposed horizontally. The rotation shaft may be lengthily disposed in the left-right direction Y. The display motor 370 may allow the display 700 to rotate so that the display 700 is erected about a rotation axis, or the display 700 is laid down.

In this specification, the display 700 is not limited to being vertically erected, but may be defined to include being erected at a predetermined angle.

The display 700 may include a front surface 701 facing a front side and a rear surface 702 facing a rear side with respect to the standing display 700. A screen that is capable of providing a variety of information to the user may be disposed on the rear surface 702 of the display 700. A touch screen may be disposed on the rear surface 702 of the display 700, and the user may input various commands through the touch screen.

The display 700 may rotate side by side with the top surface of the armrest on the armrest. In this case, the front surface 701 when the display 700 is laid horizontally may be a top surface of the display 700, and the rear surface 702 when the display 700 is erected may be a bottom surface of the display 700.

When the display 700 is laid horizontally, the screen of the display 700 is hidden from the outside, and the screen of the display 700 may be protected.

The robot 100*a* may further include at least one accessory that provides convenience to the user.

The accessory may be provided on the armrest or the main body 200, and a plurality of accessories may be provided on the robot 100*a*.

The robot 100*a* may include an accessory 800 (armrest accessory) provided on the armrest. The robot 100*a* may include an accessory 900 provided on the main body 200 (body accessory). The robot 100*a* may include both the accessory 800 provided on the armrest and the accessory 900 provided on the main body 200.

For example, the accessory 800 provided on the armrest may be a cup holder into which a cup is seated. For another example, the accessory 800 provided on the armrest may be a sub armrest having the same size and shape as the steering housing 360 but without an opening 362 defined in an upper portion thereof.

The steering housing 360 according to this embodiment may be selectively disposed on the armrest body 350 of the left armrest 340 or the armrest body 350 of the right armrest 330 for the convenience of the user. That is, the accessory 800 such as the cup holder or a sub armrest may be disposed on the armrest body 350 of the armrest, in which the steering housing 360 is not disposed, among the left armrest 340 and the right armrest 330 and may support the user's arm together with the armrest body 350.

The accessory 800 provided on the armrest is not limited to the cup holder or the sub armrest, and also is not limited to the kind thereof as long as it provides the user's convenience and is accommodated in the accommodation portion 352.

An opening 362 may be defined in the armrest, and an inner space S in which a portion of the steering 600 is accommodated may be defined in the armrest. When the robot 100a includes a pair of armrests 330 and 340, the steering 600 may be disposed on one of the pair of armrests 330 and 340.

At least one of the pair of armrests 330 and 340 may be an assembly of a plurality of members, and at least one of the pair of armrests 330 and 340 may include the armrest body 350 and the steering housing 360.

One of the pair of armrests 330 and 340 330 may include the armrest body 350 and the steering housing 360 disposed on the armrest body 350. An accommodation portion 352 in which the steering housing 360 is accommodated may be defined in the armrest body 350.

The accommodation portion 352 may be provided in a shape that is recessed in the armrest body 350. A top surface of the accommodation portion 352 may be opened. Each of the top and front surfaces of the accommodation portion 352 may be opened.

The steering housing 360 may be inserted into and accommodated in the accommodation portion 352 and may be protected by the accommodation portion 352.

The steering housing 360 may surround at least a portion of the steering 600 and may protect the steering 600.

The other one of the pair of armrests 330 and 340 may include the armrest body 350 and may further include an accessory 800 disposed on the armrest body 350. The armrest body 350 may be provided with the accommodating portion 352 in which the accessory 800 is accommodated.

The pair of armrests 330 and 340 may include the armrest body 350 having the same structure, and the steering housing 360 and the accessory 800 may be disposed symmetrical to each other in the horizontal direction. Each of the pair of armrests 330 and 340 may be provided with the accommodation portions 352 having the same shape and the same size.

The accessory 800 and the steering housing 360 may have the same size and outline shape.

The steering housing 360 and the accessory 800 may have the same shape and size and may be disposed symmetrical to each other with respect to the seating body 300.

The steering housing 360 may constitute a steering assembly together with steering 600. The steering assembly may be selectively disposed together with the accessory 800.

When the steering housing 360 is disposed on the armrest body 350 of the right armrest 330, the accessory 800 may be disposed on the armrest body 350 of the left armrest 340, and vice versa. When the steering housing 360 is disposed on the armrest body 350 of the left armrest 340, the accessory 800 may be disposed on the armrest body 350 of the right armrest 330.

For example, the accessory 900 provided on the main body 200 may be a supporter on which a user's baggage (e.g., a carrier) is placed. For another example, the accessory 900 provided on the main body 200 may be a supporter on which a medical device (e.g., crutches, medicines, etc.) assisting user's walk is supported. The accessory 900 provided on the main body 200 is not limited to the supporter, and also, the accessory 900 is not limited in kind as long as the accessory 900 moves with the user. Various kinds of accessories 900 may be separably attached to the main body 200.

The accessory 900 provided on the main body 200 may be a rear accessory disposed behind the main body 200.

The robot 100a may include a sensor 140, and the sensor 140 may include at least one sensor for autonomous driving, driving assistance, or safety.

The sensor 140 may include a rear sensor 280 capable of sensing a rear side and a rear periphery of the robot 100a. For example, the rear sensor 280 may be a lidar sensor that senses an object using a wavelength of light. The rear sensor 280 is not limited to the lidar sensor and may be configured as a radar sensor for sensing an object using electromagnetic waves or an ultrasonic sensor for sensing an object using ultrasonic waves.

The rear sensor 280 may be disposed at a rear side of the robot 100a. The rear side of the robot 100a may be defined between a center of the robot 100a and a rear end of the robot 100a in the front-rear direction X of the robot 100a. Hereinafter, the rear sensor 280 will be described as a sensor 280.

A plurality of sensors 140 may be provided on the robot 100a. The sensor 140 may include at least one front sensor 380 and 480 capable of sensing the front side and the front periphery of the robot 100a.

The front sensors 380 and 480 may be disposed in front of the robot 100a. The front part of the robot 100a may be defined between the center of the robot 100a and the front end of the robot 100a in the front-rear direction X of the robot 100a.

The front sensors 380 and 480 may be provided on the seating body 300 or the foot supporter 400.

For example, the front sensors 380 and 480 may be a lidar sensor that senses an object using a wavelength of light. The rear sensor 280 is not limited to the lidar sensor and may be configured as a radar sensor for sensing an object using electromagnetic waves or an ultrasonic sensor for sensing an object using ultrasonic waves.

A plurality of front sensors 380 and 480 may be provided on the robot 100a, and the plurality of front sensors 380 and 480 may be disposed at different heights. The plurality of front sensors 380 and 480 may include a front sensor 380 provided on the seating body 300 and a front sensor 480 disposed on the foot supporter 400.

The plurality of front sensors 380 and 480 may be configured by a combination of a lidar sensor, a radar sensor, and an ultrasonic sensor.

A height of the front sensor 380 provided on the seating body 300 may be higher than a height of the front sensor 480 disposed on the foot supporter 400, and the front sensor 380 provided on the seating body 300 may be a front upper sensor. The front sensor 480 disposed on the foot supporter 400 may be a front lower sensor.

When the robot moves forward, leftward, or rightward, the front sensors 380 and 480 may sense obstacles such as pedestrians, and the robot may control the pair of traveling motors 206 and 208 to avoid the obstacles sensed by the front sensors 380 and 480.

When the robot moves backward, leftward, or rightward, the rear sensor 280 may sense obstacles such as pedestrians, and the robot may control the pair of traveling motors 206 and 208 to avoid the obstacles sensed by the rear sensor 280.

The robot may include at least one projector 250, 260 (hereafter, referred to as a beam projector) capable of generating a laser beam (hereinafter, referred to as a beam) to the periphery of the robot, and the beam generated by the projector (see FIGS. 9 and 11) may guide the turn left or turn right of the robot around the robot.

The projector for guiding the switching of direction of the robot may be mounted on at least one of the main body 200, the seating body 300, or the foot supporter 400.

When the projector emits the beam toward the floor around the robot, the projector may be installed at a height as low as possible for beam spread or definition. When the projector is mounted on the main body 200 or the foot supporter 400, the projector may be disposed closer to a lower end of upper and lower ends of the robot and may scan a relatively clear beam toward the floor around the robot.

The robot may frequently operate in an advance mode of moving forward or in a retreat mode involving moving backward, and the projector may be placed as close to a battery 210 as possible. The projector may be placed at a position at which damage caused by the obstacles around the robot is minimized (or avoided).

In a state in which the projector is mounted on the main body 200, the projector may generate a beam toward the peripheral lower side of the main body 200.

A plurality of projectors 250 and 260 are provided on the main body 200, and the plurality of projectors may be mounted to the main body 200 to be spaced apart from each other.

The robot may turn in the left direction or in the right direction, and the robot may include a left projector 250 that generates a beam for guiding left turn and a right projector 260 that generates a beam for guiding right turn.

The left projector 250 and the right projector 260 may be disposed symmetrically left and right on the main body 200 and may have the same structure.

Each of the left projector 250 and the right projector 260 may be installed so that a beam scanning area does not overlap the foot supporter 400 and the rear accessory 900. On the other hand, each of the foot supporter 400 and the rear accessory 900 may be disposed outside the beam scanning area of the left projector 250 and may be disposed outside the beam scanning area of the right projector 260.

In the robot, the foot supporter 400 may be disposed at a front lower portion of the main body 200, the rear accessory 900 may be disposed at a rear side of the main body 200, the left projector 250 may be disposed at a left side of the main body 200, and the right projector 260 may be disposed at a right side of the main body 200 with respect to the main body 200.

In order to allow the left projector 250 and the right projector 260 to be spaced apart from the left and right sides of the main body 200, a left hole 270 in which the left projector 250 is disposed in the main body 200 and a right hole 272 in which the right projector 260 is disposed, as illustrated in FIG. 6.

The left hole 270 may be defined to be inclined downward to face a side between the left direction and the front direction. In this case, the left projector 250 may be disposed to face a left front lower direction LFL with respect to the main body 200.

The right hole 272 may be inclined downward to face a side between the right direction and the front direction. In this case, the right projector 260 may be disposed to face a right front lower direction RFL with respect to the main body 200.

Each of the left projector 250 and the right projector 260 may be spaced apart from the foot supporter 400 in the front-rear direction X, and the beam generated by the left projector 250 may not be obstructed on the left side of the foot supporter 400, but may be spread around the left projector 250. The beam generated by the right projector 260 may spread around the right projector 260 without being obstructed by the right side of the foot supporter 400.

At least a portion of each of the left projector 250 and the right projector 260 may face the foot supporter 400 in the front-rear direction X, as shown in FIG. 4.

The left projector 250 may face an upper left portion 410 of the foot supporter 400 in the front-rear direction X, and the whole or a portion of the left side of the projector 250 exposed to the outside of the main body 200 may overlap the upper left portion 410 of the foot supporter 400 in the front-rear direction X.

The right projector 260 may face an upper right portion 412 of the foot supporter 400 in the front-rear direction X, and the whole or a portion of the surface exposed to the outside of the main body 200 of the right projector 260 may overlap the upper right portion 412 of the foot supporter 400 in the front-rear direction X.

When the robot is driving or stationary, obstacles disposed in front of the robot may move toward the left projector 250 or the right projector 260, and the upper left portion 410 and the upper right portion 412 may be disposed in front of the left projector 250 and the right projector 260 to protect each of the left projector 250 and the right projector 260.

The robot may include driving motors 206 and 208 and a processor 180 that controls the left projector 250 and the right projector 260.

The processor 180 may control a pair of driving motors 206 and 208 when the robot rotates left or right and may control the left projector 250 to scan a beam that guides the robot to turn left and control the right projector 260 to scan a beam that guides the robot to turn right.

Figure 8:
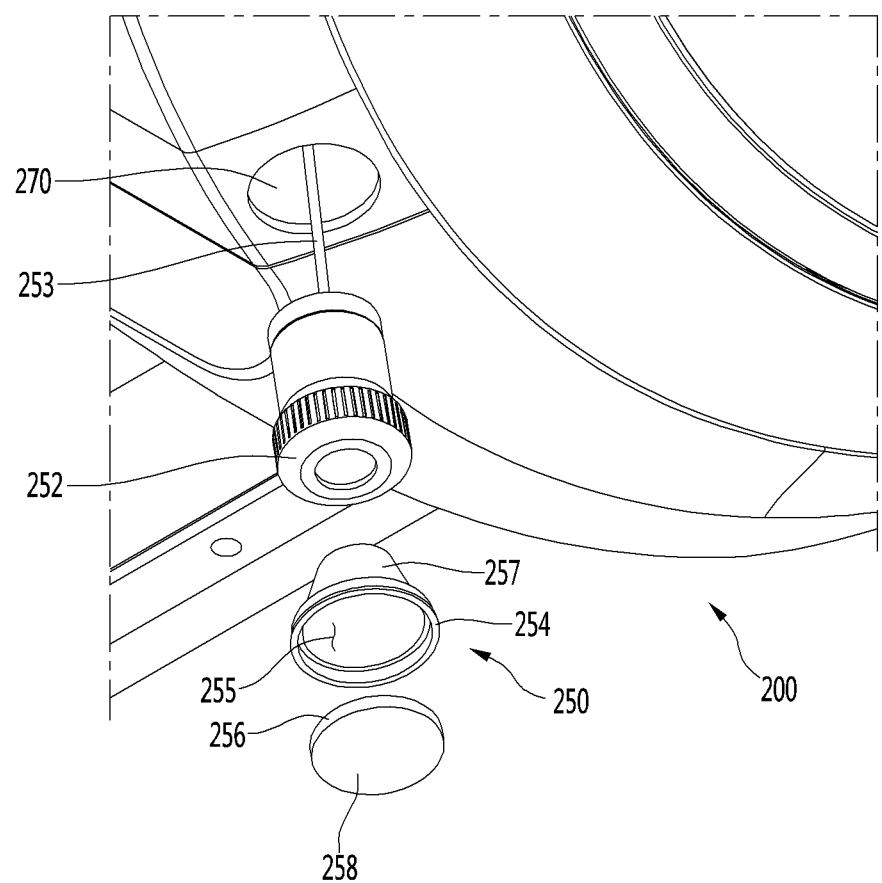
FIG. 8 is an exploded perspective view when a projector is separated from a man body according to an embodiment.

FIG. 8 is an exploded perspective view when the projector is separated from the main body 200 according to an embodiment.

The projector 250, 260 may include a laser light module 252, a module cap 254 respectively disposed in holes 270 and 272 defined in the main body 200, and a transmission plate 256 covering an outer surface of the module cap 254.

The laser light module 252 is a laser light capable of generating and scanning a laser beam and may be disposed inside the main body 200. A wire 253 may be connected to the laser light module 252, and the wire 253 may be connected to the processor 180 or to a power supply (not shown) controlled by the processor 180.

The module cap 254 may have a transmission hole 255 through which the laser beam scanned by the laser light passes. The module cap 254 may include an extension portion 257 provided to pass through the transmission hole 255 and the transmission hole 255 that is gradually expanded toward the outside of the main body 200.

The transmission plate 256 may be coupled to the module cap 254 or the main body 200 to cover the transmission hole 255. The transmission plate 256 may be made of a material such as acrylic, and one surface 258 of the transmission plate 256 may be exposed to the outside.

Figure 9:
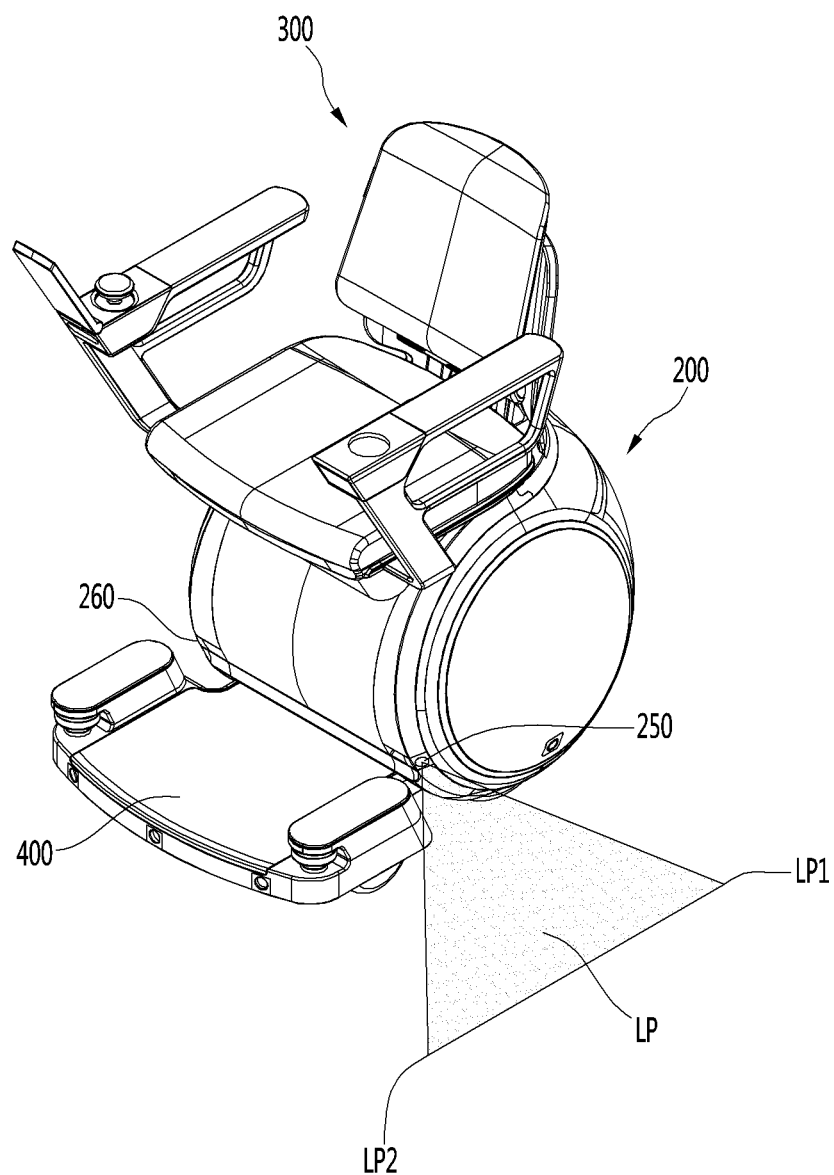
FIG. 9 is a perspective view when a left projector is turned on according to an embodiment.
Figure 10:
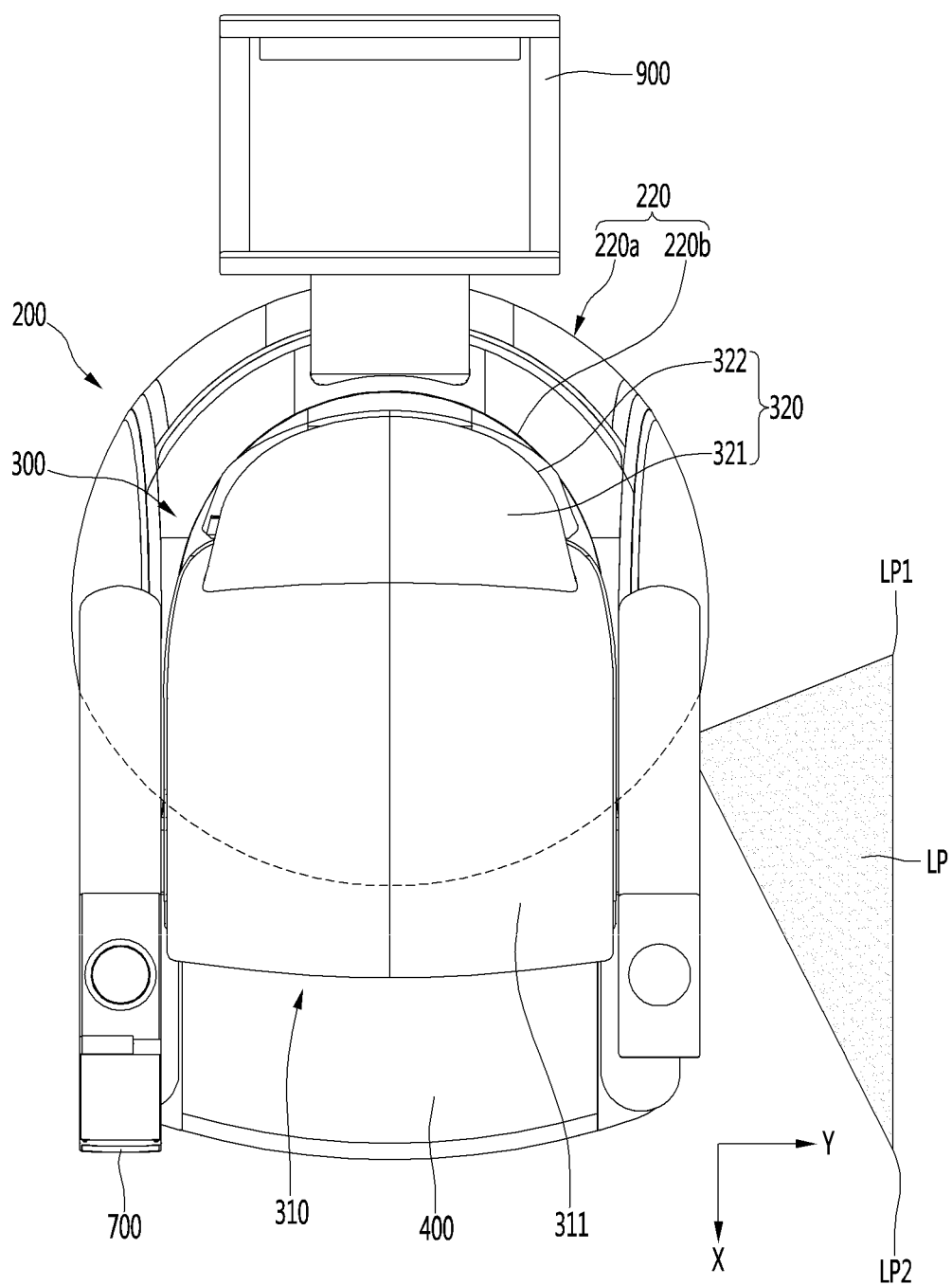
FIG. 10 is a plan view when the left projector is turned on according to an embodiment.
Figure 11:
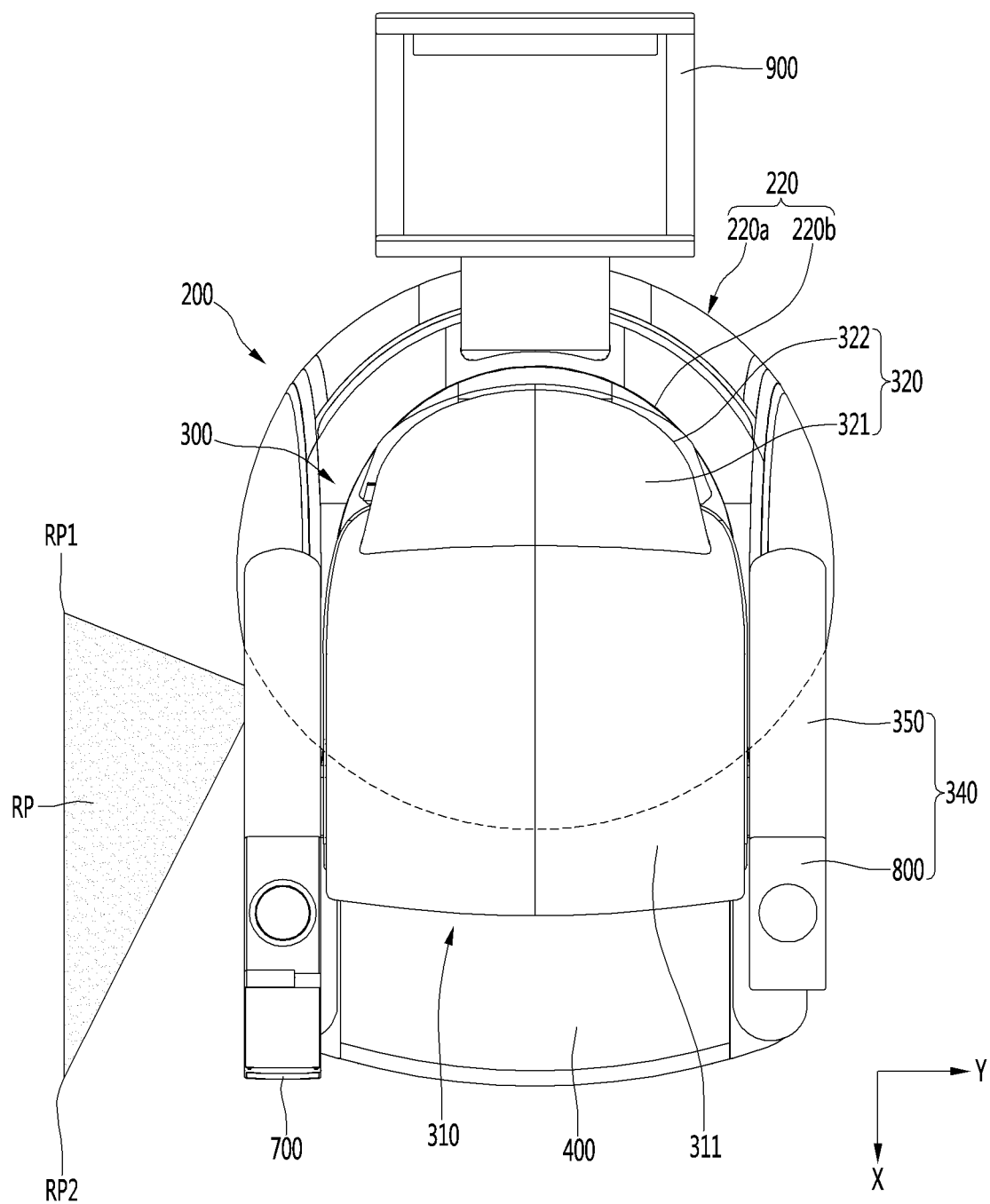
FIG. 11 is a plan view when a right projector is turned on according to an embodiment.
Figure 12:
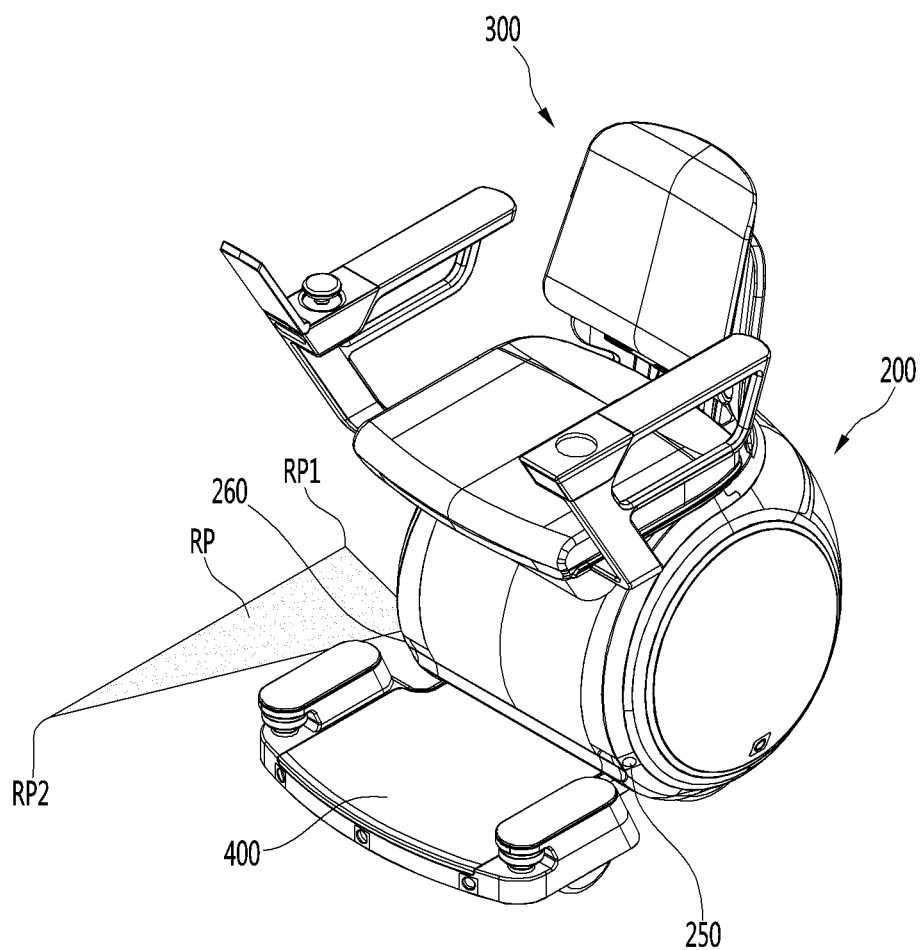
FIG. 12 is perspective view when the right projector is turned on according to an embodiment.

FIG. 9 is a perspective view when the left projector 250 is turned on according to an embodiment, and FIG. 10 is a plan view when the left projector 250 is turned on according to an embodiment. FIG. 11 is a plan view when the right projector is turned on according to an embodiment, and FIG. 12 is perspective view of the robot when the right projector is turned on according to an embodiment.

The left projector 250 may be disposed at the left side of the main body 200 to scan the beam LP toward the left lower side of the robot 100a. The beam scanning area of the left projector 250 may include a point from a left lower point LP1 of the main body 200 to a left lower point LP2 of the foot supporter 400 on the floor 200. The beam LP scanned by the left projector 250 is a beam deflected to a left side with respect to the main body 200 and may be generated while spreading from the left lower side of the main body 200 to the left lower side of the foot supporter 400.

The right projector 260 may be disposed at the right side of the main body 200 to scan the beam RP toward the right lower side of the robot. The beam scanning area of the right projector 260 may include a right lower point RP1 of the main body 200 to a right lower point RP2 of the foot supporter 400 on the floor. The beam RP scanned by the right projector 260 is a beam deflected to a right side with respect to the main body 200 and may be generated while spreading from the right lower side of the main body 200 to the right lower side of the foot supporter 400.

Each of the beam LP emitted from the left projector 250 and the beam RP emitted from the right projector 260 may function as a direction indication. In this case, the left projector 250 and the right projector 260 may be selectively turned on. That is, when one of the left projector 250 and the right projector 260 is turned on, the other of the left projector 250 and the right projector 260 may be maintained in the turn-off state.

As illustrated in FIG. 9, the right projector 260 may be maintained in the turn-off state while the left projector 250 is turned on and maintained to scan a beam onto the beam scanning area LP of the left projector 250.

On the other hand, as illustrated in FIG. 11, the left projector 250 may be maintained in the turn-off state while the right projector 260 is turned on and maintained to scan a beam onto the beam scanning area RP of the right projector 260.

The left projector 250 or the right projector 260 may be turned on from a time point at which the robot initiates the switching in direction or may be turned on before the robot initiates the switching in direction.

Also, the left projector 250 or the right projector 260 may be maintained in the turn-on state while the robot continues to be switched in direction, and when the robot has switched in direction, the turn-on state may be switched into the turn-off state.

An example, in the traveling method of the robot, the rider may manipulate the steering 600 to move forward or backward or to be switched in a left or right direction. In this case, the left projector 250 or the right projector 260 may be turned on from the time point at which the robot initiates the switching in change.

If the rider manipulates the steering 600 to be switched in the left direction, the left projector 250 may be turned on, the left projector 250 may remain in the turn-on state while the robot is switched in the left direction. When the direction switching of the robot is completed, the left projector 250 may be turned off.

On the other hand, if the rider manipulates the steering 600 to be switched in the right direction, the right projector 260 may be turned on, the right projector 260 may remain in the turn-on state while the robot is switched in the right direction. When the direction switching of the robot is completed, the right projector 260 may be turned off.

The left projector 250 or the right projector 260 may be maintained after being turned on from the turning start point of the robot, and a pedestrian or a rider around the robot may recognize that the robot is currently switched in the left or right direction.

For another example, in the traveling method of the robot, the robot may autonomously travel along a preset traveling path. When the robot travels autonomously, the traveling path along which the robot travels autonomously includes an advance path along with the robot moves forward, a retreat path along which the robot moves backward, and a direction switching path along which the robot is switched in the left or right direction while moving forward or backward. The robot may travel along a left turn path along which the robot is switched in the left direction (turn left) or a right turn path along which the robot is switched in the right direction (turn right) by a position of a structure such as a wall or an obstacle.

During autonomous driving of the robot, the left projector 250 or the right projector 260 may be turned on before the robot initiates to be switched in direction, and the pedestrian or rider around the robot may recognize that the robot will move forward or backward to the left or right side.

The robot may control speeds of the pair of traveling motors 206 and 208 so that the pair of traveling wheels 202 and 204 rotate with a speed difference so as to travel in the direction switching path.

Figure 13:
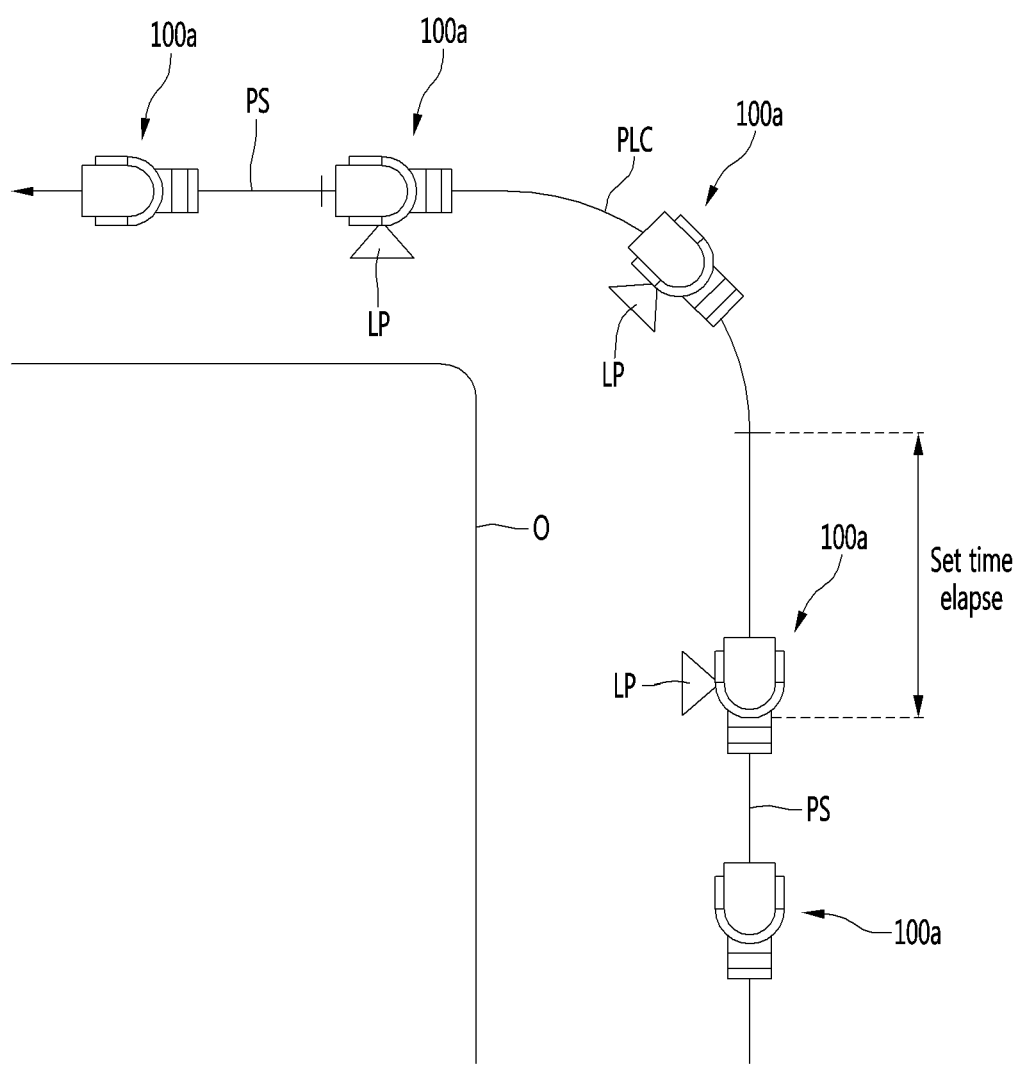
FIG. 13 is a view illustrating a process of switching a direction of the robot to a left side according to an embodiment.

The robot may drive the right traveling motor 206 at a higher speed than the left traveling motor 208 so that the right traveling wheel 202 is faster than the left traveling wheel 204. In this case, the robot travels while turning left as illustrated in FIG. 13.

Figure 14:
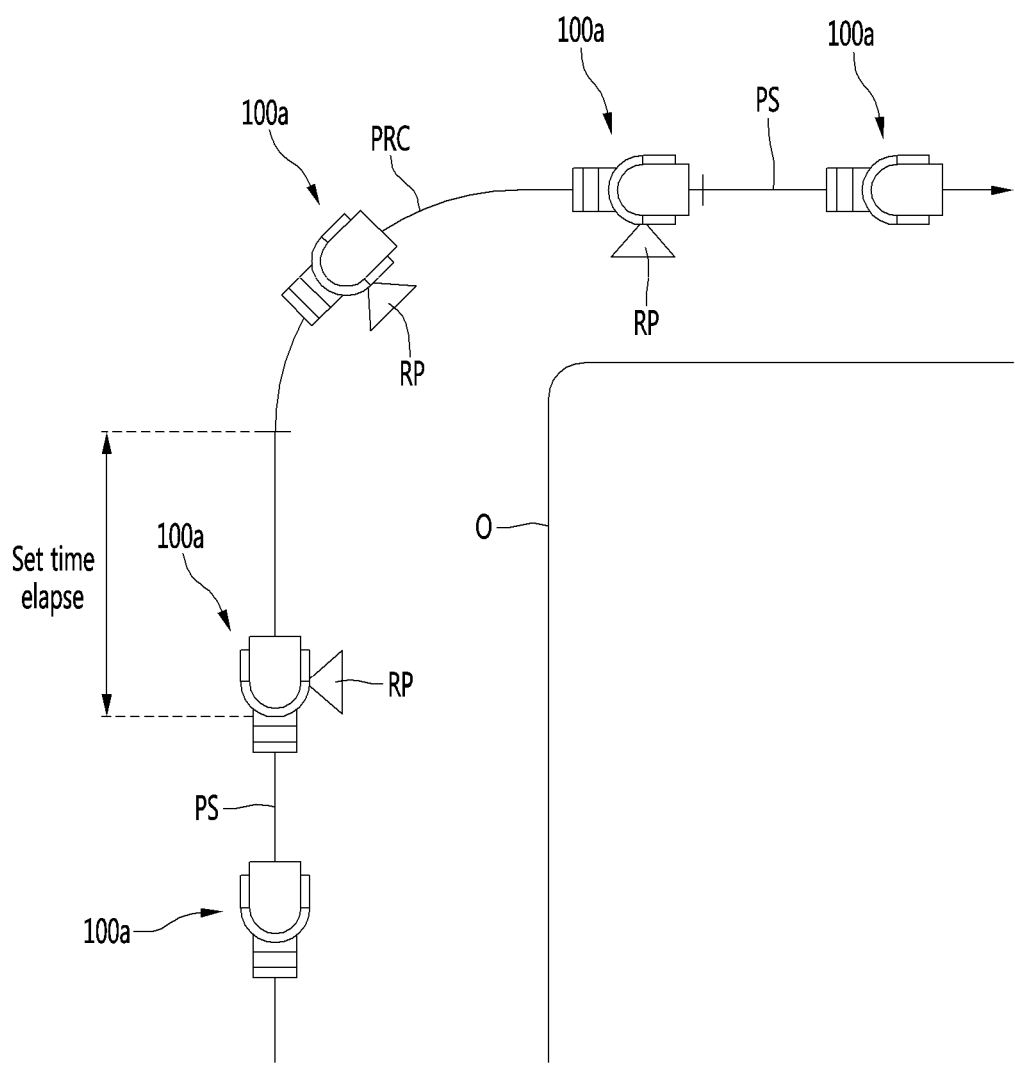
FIG. 14 is a view illustrating a process of switching a direction of the robot to a right side according to an embodiment.

The robot may drive the left traveling motor 208 at a higher speed than the right traveling motor 206 so that the left traveling wheel 204 is faster than the right traveling wheel 202. In this case, the robot travels while turning right as illustrated in FIG. 14.

In the autonomous driving of the robot, the robot may previously turn on the left projector 250 or the right projector 260 before the left traveling motor 208 and the right traveling motor 206 are controlled to have a speed difference. Here, the pedestrian or the rider may recognize that the robot being driven to be switched in the left or right direction.

That is, the left projector 250 or the right projector 260 may be turned on before the left driving motor 208 and the right driving motor 206 are controlled to have a speed difference. For example, the left projector 250 or the right projector 260 may be turned on before a set time (e.g., about 10 seconds) rather than a time point the left driving motor 208 and the right driving motor 206 are controlled to have a speed difference.

When the set time (e.g., about 10 seconds) elapses after the left projector 250 or the right projector 260 is turned on, the robot may start to be controlled to have a speed difference between the left traveling motor 208 and the right traveling motor 206. That is, the left driving motor 208 and the right driving motor 206 may be driven at different speeds while the left projector 250 or the right projector 260 is maintained in the turn-on state after being turned on.

The set time may be a time when the left projector 250 or the right projector 260 is turned on, and the left traveling motor 208 and the right traveling motor 206 are driven at the same speed.

In this embodiment, after the left projector 250 or the right projector 260 is turned on, the robot may travel forward or backward by a set distance, and then, the left traveling motor 208 and the right traveling motor 206 may be driven at different speeds.

For example, after the left projector 250 is turned on, after the robot travels may further forward or backward by the set distance, the left traveling motor 208 and the right traveling motor 206 may be driven at different speeds. On the other hand, after the right projector 260 is turned on, the robot may travel forward or backward by a set distance, and then, the left traveling motor 208 and the right traveling motor 206 may be driven at different speeds.

That is, this embodiment is not limited to driving the left traveling motor 208 and the right traveling motor 206 at different speed when the set time elapses after the projector is turned on, and the robot is set after the projector is turned on. When the robot more moves forward and backward by a distance, the method may include driving the left driving motor 208 and the right driving motor 206 at different speeds.

Hereinafter, for convenience of explanation, an example, in which the left driving motor 208 and the right driving motor 206 are driven at different speeds when the set time has elapsed after the projector is turned on, will be described.

The processor 180 may previously turn on the projector corresponding to the switching in direction of the main body 200 among the left projector 250 and the right projector 260 before the direction switching of the main body 200. The processor 180 may initiate to switch the direction of the main body 200 while the one of the left projector 250 and the right projector 260 is maintained in the turn-on state. When the set time (e.g., about 10 seconds) has elapsed since one of the left projector 250 and the right projector 260 is turned on, the processor 180 may initiate the direction switching of the main body 200. The processor 180 may maintain the turn-on state of the projector 250, 260 which is turned on during the direction switching of the main body 200. When the direction switching of the main body 200 is completed, the processor 180 may turn off the projector that is turned on.

FIG. 13 is a view illustrating a process of switching a direction of the robot to a left side according to an embodiment.

As shown in FIG. 13, the traveling path of the robot may include an advance path PS and a left turn path PLC.

The robot may move forward by driving the left driving motor 208 and the right driving motor 206 at the same speed, and the robot may move forward along the advance path PS.

The robot may drive the right driving motor 206 at a higher speed than the left driving motor 208 while the robot moves forward along the advance path PS. When the right traveling motor 206 is driven at a higher speed than the left traveling motor 208, the right traveling wheel 202 may rotate at a higher speed than the left traveling wheel 204, and the robot may travel along the left turn path PLC while switched in the left direction.

The processor 180 may turn on the left projector 250 before switched in the left direction as described above, and when the set time (e.g., about 10 seconds) elapses after turning on the left projector 250, the right driving motor 206 may be driven at a higher speed than the left driving motor 208.

When the traveling path of the robot includes the advance path PS and the left turn path PLC after the advance path PS, the processor 180 may turn on the left projector 250 while moving forward along the advance path PS. The robot may move more forward for the set time (e.g., about 10 seconds) in the state in which the left projector 250 is turned on, and when the robot reaches the left turn path PLC, the processor 180 may drive the right traveling motor 206 at a higher speed than the left traveling motor 208 while the left projector 250 is maintained in the turn-on state.

When the left turn of the main body 200 is completed, the processor 180 may turn off the left projector 250. The processor 180 may control the right driving motor 206 and the left driving motor 208 at the same speed again when the robot completely travels along the left turn path PLC, and the robot may move forward again along the advance path PS. Also, the processor 180 may turn off the left projector 250 that is maintained in the turn-on state when the robot completely travels along the left turn path PLC.

FIG. 14 is a view illustrating a process of switching a direction of the robot to a right side according to an embodiment.

As shown in FIG. 14, the traveling path of the robot may include an advance path PS and a right turn path PRC.

The robot may move forward by driving the left driving motor 208 and the right driving motor 206 at the same speed, and the robot may move forward along the advance path PS.

The robot may drive the left driving motor 208 at a higher speed than the right driving motor 206 while the robot moves forward along the advance path PS. When the left traveling motor 208 is driven at a higher speed than the right traveling motor 206, the left traveling wheel 204 may rotate at a higher speed than the right traveling wheel 202, and the robot may travel along the right turn path PLC while switched in the right direction.

The processor 180 may turn on the right projector 260 before being switched in the right direction as described above, and when the set time (e.g., about 10 seconds) elapses after turning on the right projector 260, the left driving motor 208 may be driven at a higher speed than the right driving motor 206.

When the traveling path of the robot includes the advance path PS and the right turn path PRC after the advance path PS, the processor 180 may turn on the right projector 260 while moving forward along the advance path PS. The robot may move more forward for the set time (e.g., about 10 seconds) in the state in which the right projector 260 is turned on, and when the robot reaches the right turn path PRC, the processor 180 may drive the left traveling motor 208 at a higher speed than the right traveling motor 206 while the right projector 260 is maintained in the turn-on state.

When the right turn of the main body 200 is completed, the processor 180 may turn off the right projector 260. The processor 180 may control the right driving motor 206 and the left driving motor 208 at the same speed again when the robot completely travels along the right turn path PRC, and the robot may move forward again along the advance path PS. The processor 180 may turn off the right projector 260 that is maintained in the turn-on state when the robot travels along the right turn path PRC.

Figure 15:
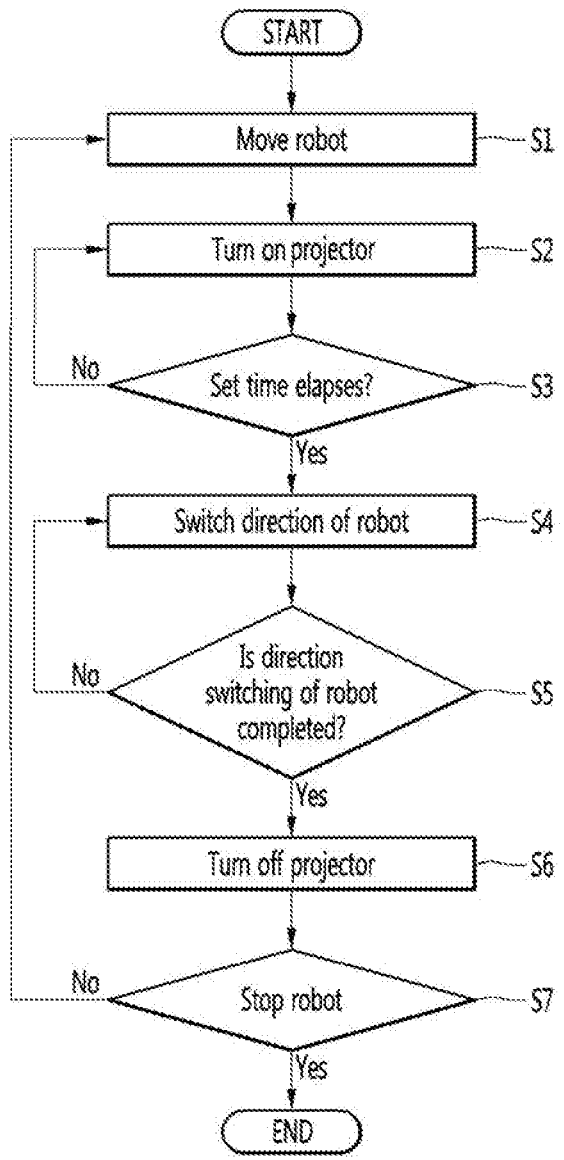
FIG. 15 is a flowchart illustrating a method for controlling a robot according to an embodiment.

FIG. 15 is a flowchart illustrating a method for controlling a robot according to an embodiment.

A method for controlling a robot according to this embodiment may control the robot. The robot may include at least one traveling wheel 202 and 204, traveling motors 206 and 208 for allowing the traveling wheel 202 and 204 to rotate, a main body 200 on which the traveling motors 206 and 208 are disposed, and a seating body 300 disposed above the main body 200. A left projector 250 may be disposed at a left side of the main body, and a right projector 260 may be disposed at a right side of the main body 200.

The method for controlling the robot may include a process (S2) of previously turning on a projector corresponding to a direction switching of the main body 200 among the left projector 250 and the right projector 260 before switching a direction of the main body 200 and processes (S3 and S4) of switching the direction of the main body 200 while the projector is turned on.

The method for controlling the robot may include a moving process (S1) in which the robot moves forward or backward. The process (S2) of previously turning on the projector may be performed during the moving process (S1) in which the robot moves forward or backward.

In an advance mode of the robot or a retreat mode of the robot, a left traveling motor 208 and a right traveling motor 206 may be driven at the same speed, and a right traveling wheel 202 and a left traveling wheel 204 may rotate at the same speed. The main body 200 may move forward or backward without being switched in a left or right direction.

The processes (S3 and S4) of switching the direction of the main body 200 may be initiated when a set time (e.g., about 10 seconds) elapses after the projector is turned on.

In a left turn mode of the robot, the right traveling motor 206 may be driven at a higher speed than the left traveling motor 208, and the right traveling wheel 202 may rotate at a higher speed than the left traveling wheel 204. Thus, the main body may be switched in the left direction.

In a right turn mode of the robot, the left traveling motor 208 may be driven at a higher speed than the right traveling motor 206, and the left traveling wheel 204 may rotate at a higher speed than the right traveling wheel 202. Thus, the main body may be switched in the right direction.

The projector may be maintained in the turn-on state during the process (S4 and S5) of switching the direction of the main body 200.

The process (S4) of switching the direction of the main body 200 may be ended when the direction switching of the main body 200 is completed (S4 and S5).

The projector that is maintained in the turn-on state may be turned off when the process of switching the direction of the main body 200 is ended (S5 and S6).

The robot may be stopped after turning left or right (S7). When the robot reaches its destination after turning left or right, the robot may be stopped without more traveling.

After the robot is turned left or right, it may return to a moving process in which the main body moves again forward or backward without stopping.

According to an embodiment, the rider sitting on the seating body or the pedestrian around the robot may easily recognize the information of the robot by looking at the beam scanned by the left projector or the beam scanned by the right projector.

In addition, since the beam is scanned under the left side of the foot supporter or under the right side of the foot supporter, the user sitting on the seating body may recognize whether the beam is scanned in the comfortable posture.

In addition, since the beam is scanned at the left lower side of the main body or at the right lower side of the main body, the pedestrian around the robot may recognize whether the beam is scanned.

In addition, the pedestrian around the robot may visually recognize the traveling direction of the robot by looking at the beam scanned by the left projector or the beam scanned by the right projector to minimize safety accidents.

In addition, the rider sitting on the seating body may recognize the switching of the direction of the robot before the direction switching of the robot and may provide comfort to the user sitting on the seating body.

In addition, since the pedestrian around the robot recognizes the left turn or the right turn of the robot to wait for the robot or avoid the robot, the robot may travel more quickly.

In addition, the left projector and the right projector may be spaced apart from the foot supporter in the front-rear direction so that the beam is scanned toward the floor around the robot without being disturbed by the foot supporter.

In addition, the foot supporter disposed in front of the left projector and the right projector in the front-rear direction may protect the left projector and the right projector.

In addition, since the foot supporter and the accessory are disposed except for the beam scanning area of the left projector and the beam scanning area of the right projector, the beam may be scanned onto the beam scanning area without interference with the foot supporter or the accessory.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot, comprising:
a main body having a left side and a right side, the main body including:
a traveling wheel; and
a traveling motor configured to rotate the traveling wheel;
a seating body disposed above the main body;
a left projector disposed at the left side of the main body, the left projector being configured to scan a beam toward a left direction;
a right projector disposed at the right side of the main body, the right projector being configured to scan a beam toward a right direction; and
a processor configured to control the traveling motor, the left projector, and the right projector,
wherein the main body further comprises:
a housing having a space; and
a battery accommodated in the space,
wherein the seating body is disposed above the housing,
wherein the robot further comprises a foot supporter disposed on a front lower portion of the housing,
wherein each of the left projector and the right projector is spaced apart from the foot supporter along a longitudinal axis in a longitudinal direction, the longitudinal direction being perpendicular to both the left direction and the right direction, and
wherein at least a portion of each of the left projector and the right projector faces a portion of the foot supporter in the longitudinal direction.

2. The robot according to claim 1,
wherein a beam scan area of the left projector includes an area from a left lower point of the main body to a left lower point of the foot supporter, and
wherein a beam scan area of the right projector includes an area from a right lower point of the main body to a right lower point of the foot supporter.

3. The robot according to claim 1, wherein, when one of the left projector and the right projector is turned on, the other one of the left projector and the right projector remains turned off.

4. The robot according to claim 1, wherein the processor is configured to autonomously drive the robot, and
wherein before the robot is set to be turned in a first direction, the processor is configured to turn on one of the left projector and the right projector that at least partially faces the first direction.

5. The robot according to claim 4, wherein the processor is further configured to initiate the turning of the robot in the first direction while the one of the left projector and the right projector remains turned on.

6. The robot according to claim 4, wherein the processor is further configured to, while the robot is turning in the first direction, maintain the one of the left projector and the right projector turned on.

7. The robot according to claim 4, wherein the processor is further configured to turn the robot in the first direction a first set time after the one of the left projector and the right projector is turned on.

8. The robot according to claim 4, wherein the processor is further configured to turn off the one of the left projector and the right projector that is turned on after the robot finishes turning in the first direction.

9. The robot according to claim 1, wherein the main body further includes:
- a left hole, the left projector being disposed in the left hole; and
- a right hole, the right projector being disposed in the right hole.

10. The robot according to claim 9, wherein the left hole faces between the left direction and a front direction and is inclined downward, and
wherein the right hole faces between the right direction and the front direction and is inclined downward.

11. The robot according to claim 9, wherein each of the left projector and the right projector includes:
- a laser light module;
- a module cap having an outer surface, the module cap being disposed in a hole defined in the main body; and
- a transmission plate covering the outer surface of the module cap.

12. A robot, comprising:
a main body having a left side and a right side, the main body including:
- a left traveling wheel;
- a right traveling wheel, the right traveling wheel being parallel to the left traveling wheel;
- a left traveling motor configured to drive the left traveling wheel; and
- a right traveling motor configured to drive the right traveling wheel;
a seating body disposed above the main body;
a left projector disposed at a left side of the main body, the left projector being configured to scan a beam toward a left direction;
a right projector disposed at a right side of the main body, the right projector being configured to scan a beam toward a right direction; and
a processor configured to:
- control the left traveling motor, the right traveling motor, the left projector, and the right projector,
- before the robot is set to be turned in a left direction, turn on the left projector and then control a rotational speed of the right traveling motor to be greater than a rotational speed of the left traveling motor, and
- before the robot is set to be turned in a right direction, turn on the right projector and then control the rotational speed of the left traveling motor to be greater than the rotational speed of the right traveling motor,
wherein the main body further comprises:
- a housing having a space; and
- a battery accommodated in the space,
wherein the seating body is disposed above the housing,
wherein the robot further comprises a foot supporter disposed on a front lower portion of the housing,
wherein each of the left projector and the right projector is spaced apart from the foot supporter along a longitudinal axis in a longitudinal direction, the longitudinal direction being perpendicular to both the left direction and the right direction, and
wherein at least a portion of each of the left projector and the right projector faces a portion of the foot supporter in the longitudinal direction.

13. The robot according to claim 12, further comprising a rear accessory connected to a rear surface of the main body,
wherein the foot supporter and the rear accessory are disposed outside a beam scan area of the left projector, and
wherein the foot supporter and the rear accessory are disposed outside a beam scan area of the right projector.

14. The robot according to claim 12, wherein the processor is further configured to:
switch the left projector from being turned on to being turned off after the robot finishes turning in the left direction, and
switch the right projection from being turned on to being turned off after the robot finishes turning in the right direction.

15. The robot according to claim 12, wherein, when one of the left projector and the right projector is turned on, the other one of the left projector and the right projector remains turned off.

* * * * *